May 6, 1924.

H. C. DUKE

BREAD TRIMMER

Filed July 16, 1923

1,493,326

Harry C. Duke
INVENTOR

BY Victor J. Evans
ATTORNEY

WITNESS:

Patented May 6, 1924.

1,493,326

UNITED STATES PATENT OFFICE.

HARRY C. DUKE, OF GREENVILLE, SOUTH CAROLINA.

BREAD TRIMMER.

Application filed July 16, 1923. Serial No. 651,903.

*To all whom it may concern:*

Be it known that I, HARRY C. DUKE, a citizen of the United States, residing at Greenville, in the county of Greenville and State of South Carolina, have invented new and useful Improvements in Bread Trimmers, of which the following is a specification.

The object of this invention is the production of simple and efficient means for slicing the outer crusts from loaves of bread.

A further object is to produce a machine for this purpose that includes a knife member adjustable with respect to a flat surface on which it is attached, and whereby loaves of bread moving over the surface for engagement by the knife, will have their outer surfaces or crusts cut therefrom.

The invention further consists in the novel construction, combination and operative association of parts, set forth in the following description, illustrated in the accompanying drawings and specifically claimed.

Figure 1:
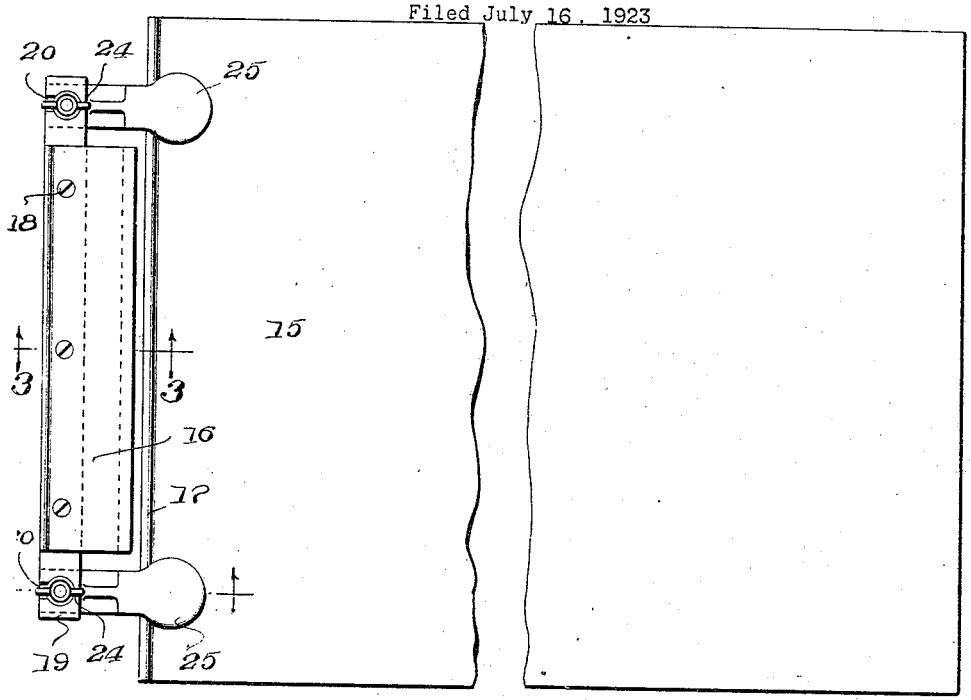
Figure 1 is a top plan view of a modification.
Figure 2:
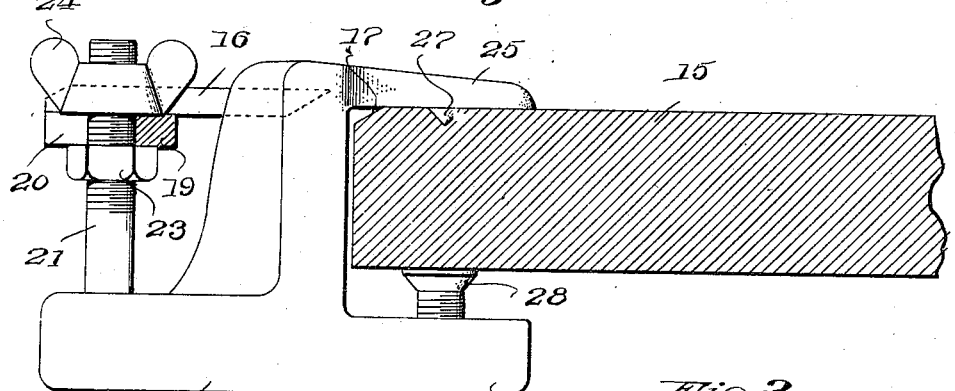
Figure 2 is a sectional view on the line 2—2 of Fig. 1.
Figure 3:
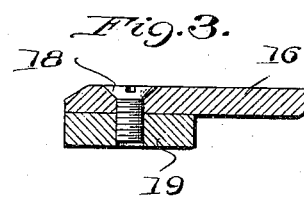
Figure 3 is a sectional view on the line 3—3 of Figure 1.

In carrying out my invention, I make use of a flat support which may be in the nature of a board or a table.

In the drawing, the support is preferably in the nature of a table top and is indicated by the numeral 15. The upper corner of the support adjacent to the cutting edge of the knife blade 16 is bevelled as at 17, and the said cutting edge of the blade 16 is bevelled in the same direction.

The blade 16 is attached, by screws 18, to a plate 19. The plate, adjacent to its ends, is notched from its outer ends as indicated by the numerals 20. Through these notches there are passed threaded posts 21 formed on the body portions 22 of brackets. The posts have screwed thereon nuts 23 which support the plate 19, and the said plate is held in tight contact with the nuts 23 by winged nuts 24 which are screwed on the outer ends of the posts 21.

The bracket 22 is formed with spaced parallel jaws 25 and 26 respectively. The upper jaws 25 have their lower faces provided with sharpened lugs 27 designed to be forced into the support 15 by the frictional contact of the swivelled head 28 with the underface of the support. The head 28 is arranged on the outer end of a screw 29 that is threaded thru an opening in each of the jaws 26 that has its lower or outer end substantially U-shaped to provide an operating handle 30.

The crusts from loaves of bread are cut by moving the same longitudinally over the support and against the cutting edge of the blade 16. The depth of crusts to be removed from the bread is regulated by the adjustment of the nuts 23 and 24.

I have herein set forth and shown on the drawings satisfactory embodiments of my invention, but it is to be understood that parts may be differently associated and details of construction may vary so that the invention is to be restricted only to the scope of the appended claims.

Having thus described my invention what I desire to claim by Letters Patent is:

1. In a device for slicing crusts from loaves of bread, a support having a bevelled upper corner, spaced brackets removably secured to the support and extending outwardly therefrom, a cutting blade adjustable on the brackets and having its cutting edge disposed opposite and arranged at the same inclination as that of the corner of the support.

2. In a device for slicing crusts from loaves of bread, a flat support having a downwardly bevelled upper corner at one end thereof, spaced brackets secured on the said end of the support having body portions below and projecting outwardly therefrom, threaded posts on the bodies, nuts screwed thereon, a plate on the posts resting on the nuts, a blade secured to the plate having its cutting edge bevelled in the same direction as the corner of the support and spaced therefrom, and binding nuts on the posts contacting said plate.

In testimony whereof I affix my signature.

HARRY C. DUKE.